(12) United States Patent
Sajoto (10) Patent No.: US 10,774,101 B2
(45) Date of Patent: Sep. 15, 2020

(54) BODIPY COMPOUNDS FOR USE IN DISPLAY DEVICES

(71) Applicant: NITTO DENKO CORPORATION, Osaka (JP)

(72) Inventor: Tissa Sajoto, Carlsbad, CA (US)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/620,579

(22) PCT Filed: Jun. 5, 2018

(86) PCT No.: PCT/US2018/036040
§ 371 (c)(1),
(2) Date: Dec. 9, 2019

(87) PCT Pub. No.: WO2018/226682
PCT Pub. Date: Dec. 13, 2018

(65) Prior Publication Data
US 2020/0165281 A1    May 28, 2020

Related U.S. Application Data

(60) Provisional application No. 62/517,077, filed on Jun. 8, 2017.

(51) Int. Cl.
| | | |
|---|---|---|
| *G07F 15/00* | (2006.01) | |
| *H01L 51/00* | (2006.01) | |
| *C07F 15/00* | (2006.01) | |
| *C09K 11/06* | (2006.01) | |
| *G02B 5/22* | (2006.01) | |
| *G02F 1/1335* | (2006.01) | |

(52) U.S. Cl.
CPC .......... *C07F 15/0033* (2013.01); *C09K 11/06* (2013.01); *G02B 5/223* (2013.01); *C09K 2211/185* (2013.01); *G02F 1/133509* (2013.01)

(58) Field of Classification Search
CPC ............................. C07F 15/0033; H01L 51/00
USPC ...................................... 546/2; 313/498, 510
See application file for complete search history.

(56) References Cited

U.S. PATENT DOCUMENTS

| | | |
|---|---|---|
| 5,433,896 A | 7/1995 | Kang et al. |
| 5,683,823 A | 11/1997 | Shi et al. |
| 6,005,113 A | 12/1999 | Wu et al. |
| 6,479,123 B2 | 11/2002 | Nishimoto et al. |
| 6,885,026 B1 | 4/2005 | Helber et al. |
| 7,026,490 B2 | 4/2006 | Hartmann et al. |
| 7,273,896 B2 | 9/2007 | Daniloff et al. |
| 8,637,215 B2 | 1/2014 | Kanna et al. |
| 8,845,095 B2 | 9/2014 | Harding et al. |
| 9,160,997 B2 | 10/2015 | Yoo et al. |
| 2002/0048645 A1 | 4/2002 | Nishimoto et al. |
| 2002/0048646 A1 | 4/2002 | Tomura et al. |
| 2004/0202625 A1 | 10/2004 | Daniloff et al. |
| 2006/0210829 A9 | 9/2006 | Vargas et al. |
| 2007/0126052 A1 | 6/2007 | Luan et al. |
| 2008/0061681 A1 | 3/2008 | Thompson et al. |
| 2013/0208445 A1 | 8/2013 | Zhou et al. |
| 2013/0265553 A1 | 10/2013 | Kotani |

OTHER PUBLICATIONS

US 5,824,893 A1, 11/2004, Hoag et al. (withdrawn)
International Search Report and Written Opinion, PCT/US2018/036040, dated Aug. 1, 2018.
Chu, G.M. et al., Fluorescence Quenching in BODIPYs Having Ir- and Rh-Tethered Complexes, European Journal of Inorganic Chemistry, 2016, 2016(6), 844-852.
Dura, L. et al., Photophysics of BODIPY Dyes as Readily-Designable Photosensitisers in Light-Driven Proton Reduction, Inorganics, 2017, 5(2), 21.

*Primary Examiner* — Charanjit Aulakh
(74) *Attorney, Agent, or Firm* — Maschoff Brennan; Brent A. Johnson; David W. Old (57) ABSTRACT

Optionally substituted BODIPY-Iridium complexes, such as those depicted Formula 4, may be useful in filters for display devices.

18 Claims, 1 Drawing Sheet

BODIPY COMPOUNDS FOR USE IN DISPLAY DEVICES

CROSS-REFERENCE TO RELATED APPLICATIONS

This application is a national phase application of PCT/US2018/036040, filed on Jun. 5, 2018, which claims the benefit of U.S. Provisional Patent Application No. 62/517,077, filed Jun. 8, 2017, the content of which is incorporated herein by reference in its entirety.

BACKGROUND

Field

The embodiments include compounds for use in color filters through which light passes.

Description of the Related Art

In color reproduction, the color gamut can be a given complete subset of colors. The most common usage refers to the subset of colors which can be accurately represented in a given circumstance, such as by a certain output device. For example, the wide-gamut Red Green Blue (RGB) color space (or Adobe Wide Gamut RGB) is an RGB color space developed by Adobe Systems that offers a large gamut by using pure spectral primary colors. It is asserted to be able to store a wider range of color values than sRGB or Adobe RGB color spaces. So, it is believed, that a display device which could provide a wider gamut could enable the device to portray more vibrant colors.

SUMMARY

Some embodiments include a coordination complex represented by a formula:

wherein $R^1$, $R^2$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or a substituent such as $C_{1-3}$ alkyl; $L^1$ is F, Cl, Br, or I, and $L^2$ is an optionally substituted cyclopentadiene anion.

Some embodiments include an optical filter comprising: a coordination complex comprising optionally substituted 4,4-difluoro-4-bora-3a,4a-diaza-s-indacene and iridium, such as a compound depicted in the paragraph above; and a polymer matrix, wherein the coordination complex is disposed within the polymer matrix; wherein the optical filter has a quantum yield of less than about 1%.

Some embodiments include a display device comprising the optical filter described herein and an RBG source positioned to allow viewing of the RGB source through the optical filter.

DETAILED DESCRIPTION

One problem with a wide color gamut is that the green and red colors can be spectrally adjacent to each other and not fully distinguishable from each other. One way to reduce these color aberrations can be to utilize an absorbing dye to reduce the amount of spectral emission and overlap in this region. In some cases, wavelength converting materials can be incorporated into display device filters. In addition, to reduce the effect of the removal of emitted light while sharpening the distinction between the perceived green and red colors, a narrow absorption spectrum, as indicated by a narrow full width half maximum (FWHM) can be desirable.

The boron-dipyrromethenes (BODIPYs) are a class of near-IR dyes. They can be fluorescent emitting materials and can be included in polymer matrices. However, there are several potential problems with these compounds.

One problem is that, being fluorescent compounds, the emission of BODIPYs can conflict with the RBG sources in display devices. A possible solution to these problems can be to alter the structure of the compound, or attach it to a transition metal complex, to quench the compound's fluorescence by changing its emission properties. However, the absorption of these compounds can correspond with the emissive wavelengths of green light, conflicting with the projection or displaying of green light. In addition, the non-emissiveness of an excited BODIPY solution does not necessarily result in an excited film having the same or similar non-emissiveness.

By employing a newly designed molecular structure, an example shown below, we report a new material that can be used in filters and/or display device applications. The BODIPY compounds described herein have one or more of the following desirable properties: low or essentially no quantum yield, high absorbance, and/or narrow full width half maximum span at the maximum absorbance.

Some filters comprising a BODIPY compound described herein can have a reduced fluorescence, e.g., display a reduced quantum yield, such as less than about 10% (or 0.1), less than about 5% (or 0.05), less than about 3% (or 0.03), less than about 2% (or 0.02), less than about 1% (or 0.01), less than about 0.8% (or 0.008), less than about 0.7% (or 0.007), less than about 0.5% (or 0.005), less than about 0.4% (or 0.004), less than about 0.2% (or 0.002), or less than about 0.1% (or 0.001). Therefore, they can be particularly useful dyes for display device color correction, improving color purity, or broadening the color reproduction range. Quantum yield measurements in solution can be made by comparing the integrated fluorescence emission of the ODIPY compound and/or BODIPY Ir complex described herein, with the integrated fluorescence of Nile blue A (QY=0.23 in ethanol) at equal dye absorbance, at the excitation wavelength. The fluorescence of the polymer alone is subtracted from that of the sample for each measurement. Quantum yield in a film can also be determined using a quantum yield spectrophotometer, e.g., Quantaurus-QY spectrophotometer Hamamatsu, Inc., Campbell, Calif., USA). In some embodiments, the BODIPY-Iridium compounds described herein can be weakly fluorescent or essentially non-fluorescent.

The BODIPY compounds of following formula can be compounds which effectively and selectively absorb light in the region above about 515 nm or above about 520 nm, e.g., greater than about 522 nm, about 500-600 nm, about 510-550 nm, about 510-530 nm, about 530-550 nm, about 510-520 nm, about 515-520 nm, about 520-525 nm, about 525-530 nm, about 530-540 nm, or about 540-550 nm. Ranges that encompass the following peak absorptions are of particular interest: about 520 nm, about 522 nm, about 525 nm.

Figure 2:
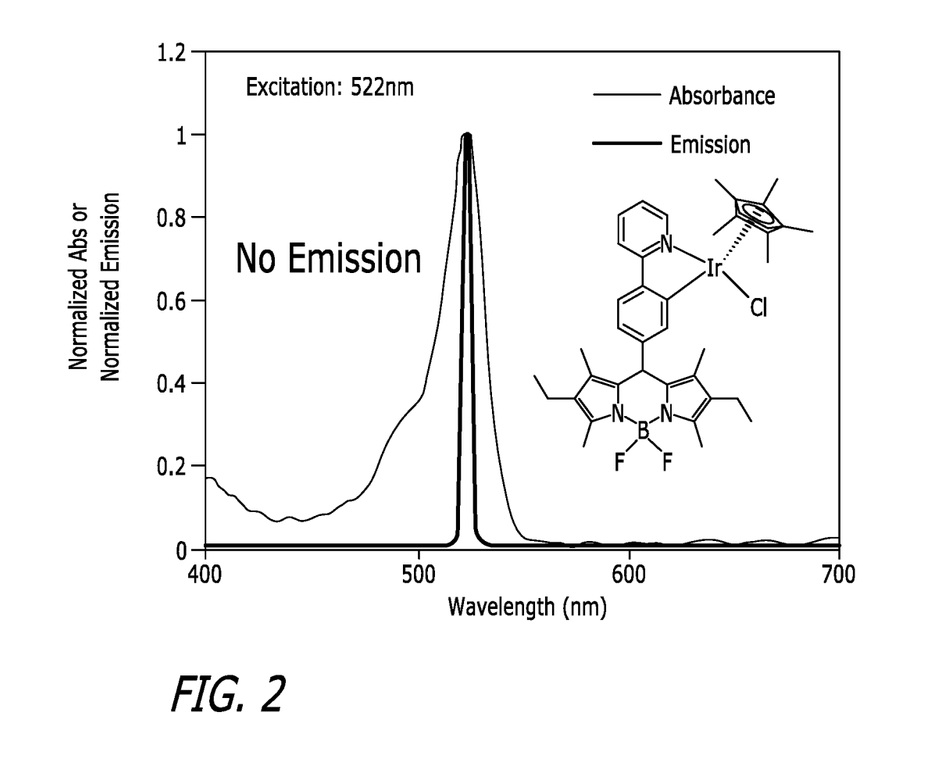
FIG. 2 is a graph depicting the normalized absorption spectra of a film comprising Ir-BODIPY Complex 1.

In some embodiments, a shoulder in absorption spectra, e.g., about 475 nm in FIG. 2, can be removed and/or reduced by modifying the compound's chemical structure[s] to be more rigid, thus restricting rotations which may cause vibronic features in absorption, which can be reflected in the spectra as a shoulder.

For some uses, such as helping to distinguish between green and/or red colors, the BODIPY compounds can have a particularly narrow full width at half maximum, such as about 50 nm or less, about 45 nm or less, about 40 nm or less, about 35 nm or less, about 30 nm or less, about 25 nm or less, about 20-50 nm, about 20-30 nm, about 30-40 nm, about 40-50 nm, or any full width at half maximum in a range bounded by any of these values.

An optical filter described herein typically contains a coordination complex dispersed within a polymer matrix.

Generally, a coordination complex described herein, for use in an optical filter or for other uses, comprises an optionally substituted 4,4-difluoro-4-bora-3a,4a-diaza-s-indacene (BODIPY) and a transition metal such as iridium. In addition to the optionally substituted BODIPY, the transition metal, e.g. iridium, may be coordinated to other ligands.

Any suitable transition metal may be used, such as V, Cu, Fe, Ir, Pt, Rh, Os, and/or Re. In some embodiments, the transition metal is Ir.

BODIPY has the structure depicted in Formula 1.

Formula 1

Unless otherwise indicated, when a compound or chemical structural feature such as aryl is referred to as being "optionally substituted," it includes a feature that has no substituents (i.e. unsubstituted), or a feature that is "substituted," meaning that the feature has one or more substituents. The term "substituent" has the broadest meaning known to one of ordinary skill in the art, and includes a moiety that occupies a position normally occupied by one or more hydrogen atoms attached to a parent compound or structural feature. In some embodiments, a substituent may be an ordinary organic moiety known in the art, which may have a molecular weight (e.g. the sum of the atomic masses of the atoms of the substituent) of 15-50 g/mol, 15-100 g/mol, 15-200 g/mol, or 15-500 g/mol. Some substituents include F, Cl, Br, I, $NO_2$, $C_{1-12}H_{3-25}$, $C_{1-12}H_{1-25}O$, $C_{1-12}H_{1-25}O_2$, $C_{1-12}H_{3-26}N$, $C_{1-12}H_{1-26}NO$, $C_{1-12}H_{3-27}N_2$, $C_{1-12}F_{3-25}$, optionally substituted phenyl, optionally substituted naphthyl, optionally substituted $C_{3-10}$ heteroaryl, etc.

For convenience, the term "molecular weight" is used with respect to a moiety or part of a molecule to indicate the sum of the atomic masses of the atoms in the moiety or part of a molecule, even though it may not be a complete molecule.

The numbering in a Formula can be used to identify the position of a hydrogen or a substituent on the BODIPY parent structure. For example, if Position 1 contains a methyl substituent, the carbon atom indicated with a "1" would be directly bonded to a methyl substituent, such as in the compound shown below.

With respect to any BODIPY structure, Position 1 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 2 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 3 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 5 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 6 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 7 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any BODIPY structure, Position 8 indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.; optionally substituted aryl, such as optionally substituted phenyl, optionally substituted 4-(pyridin-2-yl)phenyl). In some embodiments, Position 8 may contain a 4-(pyridin-2-yl)phenyl), as illustrated in Formula 2 below.

Formula 2

With respect to any 4-(pyridin-2-yl)phenyl) in position 8 of the BODIPY structure, Position 2' indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 3' indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 5' indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 6' indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 3" indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 4" indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 5" indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any 4-(pyridin-2-yl)phenyl) in position 8 of the BODIPY structure, Position 6" indicated in Formula 1 may contain H, or a substituent, such as an alkyl, e.g. $C_{1-3}$ alkyl, such as $C_1$ alkyl, $C_2$ alkyl, or $C_3$ alkyl; halo, such as F, Cl, Br, or I; fluoroalkyl, e.g. $CF_3$, etc.

With respect to any relevant structural representation, such as Formula 1 or 2, H or a substituent in Position 1, Position 2, etc. indicated in the table below may be referred to as $R^1$, $R^2$, etc.

| Position | R |
|---|---|
| 1 | $R^1$ |
| 2 | $R^2$ |
| 3 | $R^3$ |
| 5 | $R^5$ |
| 6 | $R^6$ |
| 7 | $R^7$ |
| 8 | $R^8$ |
| 2' | $R^{2'}$ |
| 3' | $R^{3'}$ |
| 5' | $R^{5'}$ |
| 6' | $R^{6'}$ |
| 3" | $R^{3"}$ |
| 4" | $R^{4"}$ |
| 5" | $R^{5"}$ |
| 6" | $R^{6"}$ |

Some BODIPY ligands may be represented by a formula:

Formula 3 wherein $R^1$, $R^2$, $R^3$, $R^5$, $R^6$, $R^7$, $R^{2'}$, $R^{3'}$, $R^{5'}$, $R^{6'}$, $R^{3"}$, $R^{4"}$, $R^{5"}$, and $R^{6"}$ are independently H or a substituent such as $C_{1-3}$ alkyl.

The optionally substituted BODIPY ligand may coordinate in 2 positions to the iridium metal. In some embodiments, the iridium metal coordinates with at least one nitrogen atom of the optionally substituted BODIPY ligand.

In some embodiments, the BODIPY ligand is optionally substituted 8-(4-(pyridin-2-yl)phenyl)-4,4-difluoro-4-bora-3a,4a-diaza-s-indacene.

8-(4-(pyridin-2-yl)phenyl)-4,4-difluoro-4-bora-3a, 4a-diaza-s-indacene

In addition to an optionally substituted BODIPY, the coordination complexes described herein may include another 1, 2, or 3 ligands. In some embodiments, the coordination complexes include an optionally substituted BODIPY and 2 additional ligands. Any suitable ligand may be used, such as an anion, a Lewis base, or an unsaturated compound, e.g. iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrite, triphenylphosphine, cyanide, carbon monoxide, acetylacetonate, alkenes, aminopolycarboxylic acids, 1,2-bis(o-aminophenoxy)ethane-n,n,n',n'-tetraacetic acid, benzene, 1,2-bis(diphenylphosphino)ethane, 1,1-bis(diphenylphosphino)methane, corroles, crown ethers, 2,2,2-cryptand, cryptates, cyclopentadienyl anion, diethylenetriamine, dimethylglyoximate, 1,4,7,10-tetraazacyclododecane-1,4,7,10-tetraacetic acid, diethylenetriaminepentaacetic acid (pentetic acid), ethylenediaminetetraacetic acid, ethylenediaminetriacetate, ethyleneglycolbis(oxyethylenenitrilo)tetraacetate, fura-2, glycinate (glycinato), heme, iminodiacetic acid, nicotianamine, nitrosyl, nitrilotriacetic acid, oxo, pyrazine, scorpionate ligand, sulfite, 2,2'; 6',2"-terpyridine, triazacyclononane, tricyclohexylphosphine, triethylenetetramine, trimethylphosphine, tri(o-tolyl)phosphine, tris(2-aminoethyl)amine, tris(2-diphenylphosphineethyl)amine, tropylium, carbon dioxide, etc. In some embodiments, the ligand is a halogen, such as F, Cl, Br, I; or an aryl anion, such as optionally substituted cyclopentadienyl anions. In some embodiments, 1, 2, or 3 ligands are Cl. In some embodiments, 1 ligand is Cl. In some embodiments, 1, 2, or 3 ligands are optionally substituted cyclopentadienyl anions, such as a pentamethylcyclopentadienyl anion. In some embodiments, 1, ligand is a pentamethylcyclopentadienyl anion.

In some embodiments, the coordination complex is represented by a formula:

Formula 4 wherein $R^1$, $R^2$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or a substituent such as $C_{1-3}$ alkyl; $L^1$ is a ligand, such as F, Cl, Br, or I; and $L^2$ is a ligand, such as an optionally substituted cyclopentadienyl anion.

With respect to any relevant structural representation, such as Formula 3 or 4, in some embodiments $R^1$ is $C_{1-3}$ alkyl, $R^2$ is $C_{1-3}$ alkyl, $R^3$ is $C_{1-3}$ alkyl, $R^5$ is $C_{1-3}$ alkyl, $R^6$ is $C_{1-3}$ alkyl, $R^7$ is $C_{1-3}$ alkyl, $R^{2'}$ is H or $C_{1-3}$ alkyl, $R^{5'}$ is H or $C_{1-3}$ alkyl, $R^{6'}$ is H or $C_{1-3}$ alkyl, $R^{3''}$ is H or $C_{1-3}$ alkyl, $R^{4''}$ is H or $C_{1-3}$ alkyl, $R^{5''}$ is H or $C_{1-3}$ alkyl, and $R^{6''}$ is H or $C_{1-3}$ alkyl.

With respect to any relevant structural representation, such as Formula 3 or 4, in some embodiments, $R^1$ is H. In some embodiments, $R^1$ is $CH_3$. In some embodiments, $R^1$ is $C_2$ alkyl. In some embodiments, $R^1$ is $C_3$ alkyl. In some embodiments, $R^1$ is H, $C_2$ alkyl, or $C_3$ alkyl; and $R^2$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl.

With respect to any relevant structural representation, such as Formula 3 or 4, in some embodiments, $R^3$ is H. In some embodiments, $R^3$ is $CH_3$. In some embodiments, $R^3$ is $C_2$ alkyl. In some embodiments, $R^3$ is $C_3$ alkyl. In some embodiments, $R^3$ is H, $C_2$ alkyl, or $C_3$ alkyl; and $R^1$, $R^2$, $R^5$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl.

With respect to any relevant structural representation, such as Formula 3 or 4, in some embodiments, $R^5$ is H. In some embodiments, $R^5$ is $CH_3$. In some embodiments, $R^5$ is $C_2$ alkyl. In some embodiments, $R^5$ is $C_3$ alkyl. In some embodiments, $R^5$ is H, $C_2$ alkyl, or $C_3$ alkyl; and $R^1$, $R^2$, $R^3$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl.

With respect to any relevant structural representation, such as Formula 3 or 4, in some embodiments, $R^7$ is H. In some embodiments, $R^7$ is $CH_3$. In some embodiments, $R^7$ is $C_2$ alkyl. In some embodiments, $R^7$ is $C_3$ alkyl. In some embodiments, $R^7$ is H, $C_2$ alkyl, or $C_3$ alkyl; and $R^1$, $R^2$, $R^3$, $R^5$, $R^6$, $R^{2'}$, $R^{5'}$, $R^{6'}$, $R^{3''}$, $R^{4''}$, $R^{5''}$, and $R^{6''}$ respect to any relevant structural representation, such as Formula 3 or 4, in some embodiments, $R^2$ is $CH_2CH_3$. In some embodiments, $R^2$ is $C_{1-3}$ alkyl; and $R^1$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl.

With respect to any relevant structural representation, such as Formula 3 or 4, in some embodiments, $R^6$ is $CH_2CH_3$. In some embodiments, $R^6$ is $C_{1-3}$ alkyl; and $R^1$, $R^2$, $R^3$, $R^5$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl.

With respect to any relevant structural representation, such as Formula 3 or 4, in some embodiments, at least one of $R^1$, $R^3$, $R^5$, and $R^7$ is not $CH_3$.

With respect to any relevant structural representation, such as Formula 3 or 4, in some embodiments, at least one of $R^2$ and $R^6$ is not H.

With respect to any relevant structural representation, such as Formula 3 or 4, in some embodiments, at least one of $R^1$, $R^3$, $R^5$, and $R^7$ is not $CH_3$, or at least one of $R^2$ and $R^6$ is not H.

In some embodiments, the coordination complex is not:

For some coordination complexes, two non-BODIPY ligands, e.g. $L^1$ and $L^2$, may be nonplanar with the pyridinylphenyl system of a ligand such as that depicted in Formula 3 or Formula 4. For example, the dihedral angle between the pyridinyl phenyl-Ir plane and the $L^1$-Ir-$L^2$ plane may be greater than 45°, 75°, 80°, and/or 90°. In some embodiments, the dihedral angle between the pyridinyl phenyl-Ir plane and the $L^1$-Ir-$L^2$ plane is about 80-100°, about 85-95°, or about 90°.

One useful coordination complex is:

or a stereoisomer, such as an enantiomer, or a diastereomeric or racemic mixture thereof.

The polymer matrix may be composed of, or may comprise, any suitable polymer, such as an acrylic, a polycarbonate, an ethylene-vinyl alcohol copolymer, an ethylene-vinyl acetate copolymer or a saponification product thereof, an AS, a polyester, a vinyl chloride-vinyl acetate copolymer, a polyvinyl butyral, polyvinylphosphonic acid (PVPA), a polystyrene, a phenolic resin, a phenoxy resin, a polysulfone, a nylon, a cellulosic resin, a cellulose acetate, etc. In some embodiments, the polymer is an acrylic or acrylate polymer. In some embodiments, the polymer matrix comprises poly(methyl methacrylate).

An oxygen scavenging agent may be present in the polymer matrix to, e.g. help reduce oxidation of the coordination complex. This may help to improve the color stability of the filter.

The filter may have any suitable configuration where the coordination complex is dispersed within a polymer matrix. In some embodiments, the polymer matrix acts as a binder resin. Representative examples of the configuration of the filter include a laminate structure composed of a transparent sheet or film substrate and a layer containing the compound dispersed within a polymer that acts as a binder resin, and a single layer structure, e.g., a sheet or film made of a binder resin containing the compound.

In some embodiments, the polymer matrix containing the coordination complex is in the form of a layer having a thickness of about 0.1-100 μm, about 0.1-20 μm, about 20-40 μm, about 40-60 μm, about 60-100 μm, about 0.1 μm to about 50 μm, or about 30 μm to about 100 μm.

If two or more BODIPY compounds are used, they can be mixed into a single layer or a single film of the above laminate, or a plurality of layers or films each containing a compound may be provided. In such a case, a laminate is formed even in the above-described latter case. Filter properties may be tuned by adjusting the binder resins depending on the respective BODIPY used in the resin.

The laminate filter can be prepared by, for example, (1) a method comprising dissolving or dispersing the compound and a binder resin in an appropriate solvent and applying the solution or dispersion on a transparent sheet or film substrate by a conventional method, followed by drying, (2) a method comprising melt-kneading the compound and a binder resin, molding the mixture into a film or a sheet by a conventional molding technique for thermoplastic resins such as extrusion, injection molding or compression molding, and adhering the film or sheet to a transparent substrate, e.g., with an adhesive, (3) a method comprising extrusion laminating a molten mixture of the BODIPY compound and a binder resin on a transparent substrate, (4) a method comprising co-extruding a molten mixture of the BODIPY compound and a binder resin with a molten resin for a transparent substrate, or (5) a method comprising molding a binder resin into a film or a sheet by extrusion, injection molding, compression molding, etc., bringing the film or the sheet into contact with a solution of the BODIPY compound, and the thus dyed film or sheet is adhered to a transparent substrate, e.g., with an adhesive.

The single layer sheet or film comprising a resin containing the BODIPY compound is prepared by, for example, (1) a method comprising casting a solution or dispersion of the BODIPY compound and a binder resin in an appropriate solvent on a carrier followed by drying, (2) a method comprising melt-kneading the BODIPY compound and a binder resin and molding the mixture into a film or a sheet by a conventional molding technique for thermoplastic resins such as extrusion, injection molding or compression molding, or (3) a method comprising molding a binder resin into a film or a sheet by extrusion, injection molding, compression molding, etc. and bringing the film or the sheet into contact with a solution of the BODIPY compound.

The laminate filter can comprise a transparent substrate having a BODIPY compound-containing resin layer disposed on the surface of the transparent substrate. The BODIPY compound-containing resin layer may comprise a binder resin and the BODIPY compound dispersed within the binder resin. This type of laminate filter may be produced by coating a transparent sheet or film substrate with a coating composition prepared by dissolving the BODIPY compound and a binder resin in an appropriate solvent or dispersing the particles of the compound having a particle size of 0.1 to 3 micrometers (μm) and a binder resin in a solvent and drying the coating film.

The method of making the filter can be chosen according to the layer structure and material fit for a particular use.

Materials of the transparent substrate which can be used in the filter for LCD's and/or PDPs are not particularly limited as far as they are substantially transparent, having little light absorption, and causing little light scattering. Examples of suitable materials include glass, polyolefin resins, amorphous polyolefin resins, polyester resins, polycarbonate resins, acrylic resins, polystyrene resins, polyvinyl chloride resins, polyvinyl acetate resins, polyarylate resins, and polyether sulfone resins. A suitable example includes poly (methyl methacrylate) (PMMA).

The resin can be molded into a film or a sheet by conventional molding methods, such as injection molding, T-die extrusion, calendering and compression molding, and/or by casting a solution of the resin in an organic solvent. The resin can contain commonly known additives, such as anti-heat aging agents, lubricants, scavenging agents, and antioxidants. The substrate can have a thickness of 10 micrometers (μm) to 5 mm. The resin film or sheet may be unstretched or stretched film or sheet. The substrate may be a laminate of the above-described material and other films or sheets.

If desired, the transparent substrate can be subjected to a known surface treatment, such as a corona discharge treatment, a flame treatment, a plasma treatment, a glow discharge treatment, a surface roughening treatment, or a chemical treatment. If desired, the substrate can be coated with an anchoring agent or a primer.

The solvent which can be used for dissolving or dispersing the dye and the resin can include alkanes, such as butane, pentane, hexane, heptane, and octane; cycloalkanes, such as cyclopentane, cyclohexane, cycloheptane, and cyclooctane; alcohols, such as ethanol, propanol, butanol, amyl alcohol, hexanol, heptanol, octanol, decanol, undecanol, diacetone alcohol, and furfuryl alcohol; cellosolves, such as methyl cellosolve, ethyl cellosolve, butyl cellosolve, methyl cellosolve acetate, and ethyl cellosolve acetate; propylene glycol and its derivatives, such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketones, such as acetone, methyl amyl ketone, cyclohexanone, and acetophenone; ethers, such as dioxane and tetrahydrofuran; esters, such as butyl acetate, amyl acetate, ethyl butyrate, butyl butyrate, diethyl oxalate, ethyl pyruvate, ethyl 2-hydroxybutyrate, ethyl acetoacetate, methyl lactate, ethyl lactate, and methyl 3-methoxypropionate; halogenated hydrocarbons, such as chloroform, methylene chloride, and tetrachloroethane; aromatic hydrocarbons, such as benzene, toluene, xylene, and cresol; and highly polar solvents, such as dimethyl formamide, dimethyl acetamide, and N-methylpyrrolidone.

An RGB source is a light source which emits at the same time red, green and blue light. Such sources are required mainly for color display applications. A wide range of colors can be obtained by mixing different amounts of red, green and blue light (additive color mixing). Suitable RGB sources include, but are not limited to, a cathode ray tube (CRT), liquid crystal display (LCD), plasma display, or organic light emitting diode (OLED) display such as a television, a computer monitor, or a large scale screen. Each pixel on the screen can be built by driving three small and very close but still separated RGB light sources. At common viewing distance, the separate sources may seem indistinguishable, which can trick the eye to see a given solid color. All the pixels arranged together in the rectangular screen surface conforms the color image.

Figure 1:
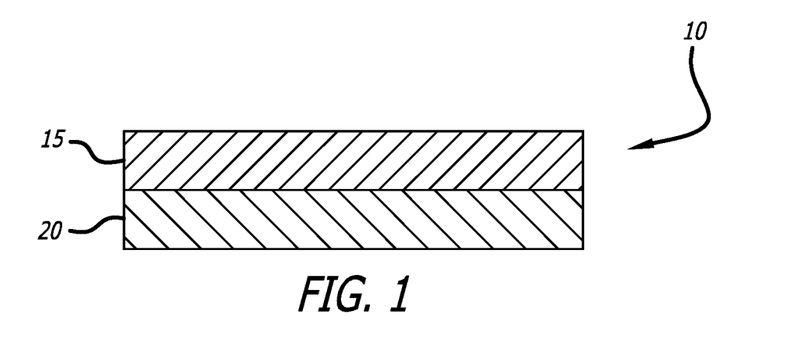
FIG. 1 is a schematic diagram of an example of a display device having a filter comprising the compound described herein.

An example of a configuration of the device comprising a compound described herein is shown in FIG. 1. The device 10 can comprise the following layers in the order given: a filter layer 15 and a display layer 20. In some embodiments, the display layer can be the outermost layer or surface of a display device, e.g., an RGB source. Suitable RGB sources can be a liquid crystal display device, a plasma display panel and/or a cathode ray terminal. In some embodiments, the filter layer 15 can be positioned for viewing the RGB source there through by the viewer, e.g., on the distal or external side of the RGB source. In some embodiments, viewing the RGB source through the filter layer can increase the color distinction between the red and green colors.

The following embodiments are specifically contemplated herein:

Embodiment 1

A coordination complex represented by a formula:

wherein $R^1$, $R^2$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl; $L^1$ is F, Cl, Br, or I, and $L^2$ is an optionally substituted cyclopentadiene anion.

Embodiment 2

The coordination complex of embodiment 1, wherein $R^2$ is $C_{1-3}$ alkyl.

Embodiment 3

The coordination complex of embodiment 1 or 2, wherein $R^6$ is $C_{1-3}$ alkyl.

Embodiment 4

The coordination complex of embodiment 1, that is:

or a mixture thereof.

Embodiment 5

An optical filter comprising:
a coordination complex comprising optionally substituted 4,4-difluoro-4-bora-3a,4a-diaza-s-indacene and iridium; and
a polymer matrix, wherein the coordination complex is dispersed within the polymer matrix;
wherein the filter has a quantum yield of less than about 1%.

Embodiment 6

An optical filter comprising:
the coordination complex of claim 1, 2, 3, or 4, and
a polymer matrix, wherein the coordination complex is disposed within the polymer matrix;
wherein the filter has a quantum yield of less than about 1%.

Embodiment 7

The optical filter of embodiment 5 or 6, wherein the polymer matrix comprises poly(methyl methacrylate) (PMMA).

Embodiment 8

The optical filter of embodiment 5, 6, or 7, wherein the polymer matrix is in the form of a layer having a thickness of about 0.1 μm to about 50 μm.

Embodiment 9

The optical filter of embodiment 5, 6, 7, or 8, wherein the filter has a peak absorption that is greater than about 515 nm.

Embodiment 10

The optical filter of embodiment 9, wherein the filter has a peak absorption that is greater than about 522 nm.

Embodiment 11

The optical filter of embodiment 5, 6, 7, 8, 9, or 10, wherein the filter has a full width at half maximum (FWHM) of less than about 50 nm.

Embodiment 12

The optical filter of embodiment 11, wherein the filter has an FWHM of about 20 to about 30 nm.

Embodiment 13

A display device comprising the optical filter of embodiment 5, 6, 7, 8, 9, 10, 11, or 12 and an RBG source positioned to allow viewing of the RGB source through the optical filter.

EXAMPLES

The following are examples of some methods that may be used to prepare and use the compounds described herein.

Example 1

Synthesizing BODIPY Materials

8-1. Example of Synthesis

Example 1.1

Scheme 1.1. Synthesis of BODIPY Compound 1

-continued

BODIPY Compound 1

Synthesis of BODIPY Compound 1:

4-(pyridin-2-yl)benzaldehyde (1 g, 5.46 mmol) and 3-ethyl-2,4-dimethyl-1H-pyrrole (1.34 g, 10.92 mmol) were dissolved in dichloromethane (80 mL) in a round-bottomed flask. Trifluoroacetic acid (2 drops) was added into the reaction mixture and stirred for 12 hours at room temperature. The completion of reaction was monitored by LC-MS (APCI, mz 412). After the reaction completed, DDQ (1.24 g) was added into the reaction mixture to oxidize the dipyrromethane to make a dipyrrin. The reaction was stirred for 30 minutes at room temperature and the reaction completion was confirmed by LC-MS (APCI, mz 410). After completion, the reaction mixture was filtered through Celite and the filtrate was transferred to a round-bottomed flask. To the round-bottom flask containing the filtrate, triethylamine (4.6 mL) and $BF_3 \cdot Et_2O$ (6.1 mL) were added into the reaction mixture and stirred for 1 hour at room temperature. The reaction mixture was then refluxed for 1 hour and the completion of reaction was checked by LC-MS. Upon the completion of the reaction, the solvent was removed under reduced pressure and the crude product was purified by silica gel column chromatography (Combi-flash) with dichloromethane/hexanes eluent with 0% to 50% dichloromethane gradient. The fractions containing desired product (checked by TLC) were then combined and concentrated to give a dark red solid (0.586 g). The desired product was confirmed by LC-MS (APCI): mz 458.

Scheme 1.2. Synthesis of Iridium-tethered BODIPY Complex 1

Iridium-tethered BODIPY Complex 1

Synthesis of Iridium-Tethered BODIPY Complex 1:

BODIPY Compound 1 (0.1 g, 0.218 mmol) and dichloromethane (30 mL) was placed in a round-bottomed flask. Sodium acetate (43 mg, 0.519 mmol) and [IrCp*Cl$_2$]dimer (87 mg, 0.109 mmol) were added into the reaction flask. The reaction mixture was stirred at room temperature overnight. The next day, the reaction mixture was filtered through Celite and the filtrate was concentrated to obtain crude product. The crude product was then purified by silica gel column chromatography (Combi-flash) with dichloromethane/hexanes having a gradient from 0% to 100% dichloromethane to elute the remaining starting material. Then the eluent was changed to 100% ethyl acetate to elute desired product. The fractions containing desired product (checked by TLC) were then combined and concentrated to yield iridium-tethered BODIPY Complex 1 as an orange solid (73 mg), confirmed by LC-MS (APCI, negative mode) mz 819.

Example 2.1 Fabrication of Filter Layer

A glass substrate was prepared in substantially the following manner. A 1.1 mm thick glass substrate measuring 1 inch×1 inch was cut to size. The glass substrate was then washed with detergent and deionized (DI) water, rinsed with fresh DI water, and sonicated for about 1 hour. The glass was then soaked in isopropanol (IPA) and sonicated for about 1 hour. The glass substrate was then soaked in acetone and sonicated for about 1 hour. The glass was then removed from the acetone bath and dried with nitrogen gas at room temperature.

A 25 wt % solution of Poly(methyl methacrylate) (PMMA) (average M.W. 120,000 by GPC from Sigma Aldrich) copolymer in cyclopentanone (99.9% pure) was prepared. The prepared copolymer was stirred overnight at 40° C. [PMMA] CAS: 9011-14-7; [Cyclopentanone] CAS: 120-92-3

The 25% PMMA solution prepared above (4 g) was added to 3 mg of the iridium tethered BODIPY complex made as described above in a sealed container, and mixed for about 30 minutes. The PMMA/Chromophore solution was then spin coated onto a prepared glass substrate at 1000 RPM for 3 s; then 1500 RPM for 20 s and then 500 RPM for 2 s. The resulting wet coating had a thickness of about 10 μm. The samples were covered with aluminum foil before spin coating to protect them from exposure to light. Three samples each were prepared in this manner for each quantum yield and/or stability study. The spin coated samples were baked in a vacuum oven at 80° C. for 3 hours to evaporate the remaining solvent.

The 1 inch×1 inch sample was inserted into a Shimadzu, UV-3600 UV-VIS-NIR spectrophotometer (Shimadzu Instruments, Inc., Columbia, Md., USA). All device operation was performed inside a nitrogen-filled glove-box. The resulting absorption spectrum is shown in FIG. 2. The maximum absorption was normalized at about 100% at a wavelength of 522 nm (the perceived maximum absorbance wavelength), and the half-value width (FWHM) at the maximum absorption was 25 nm.

The fluorescence spectrum of a 1 inch×1 inch film sample prepared as described above was determined using a Fluorolog spectrofluorometer (Horiba Scientific, Edison, N.J., USA) with the excitation wavelength set at the respective maximum absorbance wavelength.

The quantum yield of a 1 inch×1 inch sample prepared as described above were determined using a Quantarus-QY spectrophotometer (Hamamatsu Inc., Campbell, Calif., USA) set at the respective maximum absorbance wavelength. The quenching compounds of the invention were weakly fluorescent or essentially non-fluorescent.

The compound lifetime/stability in film was determined by placing a 1 inch by 1 inch film sample (film with BODIPY complex 1 or BODIPY-Ir complex 1) in a vacuum oven at 80° C. and periodically checking the absorbance of the sample by UV-Vis Spectrometer. After 527 hours, the absorbance was about 87% of the original absorbance (see table 1). In another example, a 1 inch×1 inch sample was placed in ambient air in an 85° C. oven. After 509.5 hours, the absorbance was about 80% and 64% as indicated in Table 1.

The results of the film characterization (absorption peak wavelength, FWHM, and quantum yield) are shown in Table 1 below.

TABLE 1

| Compound | Structure | Absorption Maximum (nm) | FWHM (nm) | Quantum yield in Film (PMMA) | Remaining Abs % in PMMA after 527 hours (Vacuum, 80° C.) | Remaining Abs % in PMMA after 509.5 hours (In Air, 85° C.) |
|---|---|---|---|---|---|---|
| BODIPY-1 + Iridium Cp*Cl | | 522 nm | 25 | 0.7% | 87% | 64% |

TABLE 1-continued

| Compound | Structure | Absorption Maximum (nm) | FWHM (nm) | Quantum yield in Film (PMMA) | Remaining Abs % in PMMA after 527 hours (Vacuum, 80° C.) | Remaining Abs % in PMMA after 509.5 hours (In Air, 85° C.) |
|---|---|---|---|---|---|---|
| BODIPY-1 | *structure shown below* | 525 nm | 25 nm | 65.0% | 92% | 80% |

*Structure of BODIPY-1: a BODIPY core (difluoroboron dipyrromethene with methyl and ethyl substituents on the pyrrole rings) connected at the meso position to a phenyl group bearing a 2-pyridyl substituent.*

Thus at least the BODIPY-1 Iridium complex demonstrated its effectiveness as a filter material useful in display devices since the quantum yield appears to be quenched after the tethering of the BODIPY moiety to the Iridium.

It will be understood by those of skill in the art that numerous and various modifications can be made without departing from the spirit of the present invention. Therefore, it should be clearly understood that the forms of the present invention are illustrative only and are not intended to limit the scope of the present invention. Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A coordination complex represented by a formula:

wherein $R^1$, $R^2$, $R^3$, $R^5$, $R^6$, $R^7$, $R^{2'}$, $R^{5'}$, $R^{6'}$, $R^{3''}$, $R^{4''}$, $R^{5''}$, and $R^{6''}$ are independently H or $C_{1-3}$ alkyl; $L^1$ is F, Cl, Br, or I, and $L^2$ is an optionally substituted cyclopentadiene anion; wherein at least one of $R^1$, $R^3$, $R^5$, and $R^7$ is not $CH_3$, or at least one of $R^2$ and $R^6$ is not H.

2. The coordination complex of claim 1, wherein $R^2$ is $C_{1-3}$ alkyl.

3. The coordination complex of claim 1, wherein $R^6$ is $C_{1-3}$ alkyl.

4. The coordination complex of claim 1, that is:

or a mixture thereof.

5. An optical filter comprising:
the coordination complex of claim 1, and
a polymer matrix, wherein the coordination complex is disposed within the polymer matrix;
wherein the filter has a quantum yield of less than about 1%.

6. The optical filter of claim 5, wherein the polymer matrix comprises poly(methyl methacrylate) (PMMA).

7. The optical filter of claim 5, wherein the polymer matrix is in the form of a layer having a thickness of about 0.1 μm to about 50 μm.

8. The optical filter of claim 5, wherein the filter has a peak absorption that is greater than about 515 nm.

9. The optical filter of claim 8, wherein the filter has a peak absorption that is greater than about 522 nm.

10. The optical filter of claim 5, wherein the filter has a full width at half maximum (FWHM) of less than about 50 nm.

11. The optical filter of claim 10, wherein the filter has an FWHM of about 20 to about 30 nm.

12. A display device comprising the optical filter of claim 11 and an RBG source positioned to allow viewing of the RGB source through the optical filter.

13. The optical filter of claim 8, wherein the filter has a peak absorption that is about 522 nm.

14. The optical filter of claim 8, wherein the filter has a peak absorption that is about 525 nm.

15. The optical filter of claim 8, wherein the coordination complex is:

16. The optical filter of claim 8, wherein the coordination complex is:

17. The coordination complex of claim 1, that is:

18. The coordination complex of claim 1, that is:

* * * * *